United States Patent [19]

Panuska

[11] Patent Number: 4,561,795
[45] Date of Patent: Dec. 31, 1985

[54] BIASED HARMONIC LOCKING RING

[75] Inventor: Brian R. Panuska, Phoenix, Ariz.

[73] Assignee: Sperry Corporation, New York, N.Y.

[21] Appl. No.: 611,297

[22] Filed: May 17, 1984

[51] Int. Cl.[4] ................................................ F16D 1/00
[52] U.S. Cl. .......................................... 403/4; 74/395;
474/900
[58] Field of Search ............................. 403/4, 14, 13;
123/90.15; 74/395; 474/900, 902

[56] References Cited

U.S. PATENT DOCUMENTS 3,734,073  5/1973  Walter .............................. 74/395 X

FOREIGN PATENT DOCUMENTS 21765  10/1911  United Kingdom ............. 123/90.15

Primary Examiner—Andrew V. Kundrat
Attorney, Agent, or Firm—Howard P. Terry; Martin G. Anderson

[57] ABSTRACT

A harmonic locking ring having a predetermined number of spaced holes centered on a major and minor circumference. Said holes fit over pins in concentric parts thereby locking parts together in desired positions within very close tolerances.

2 Claims, 5 Drawing Figures

BIASED HARMONIC LOCKING RING

The Government has rights in the invention pursuant to Contract No. F33657-82-C-3094 awarded by the Department of Defense.

BACKGROUND OF THE INVENTION

1. Field of the Invention

The invention pertains to a locking apparatus for maintaining the relative angular position of concentric parts.

2. Description of the Prior Art

In various mechanical apparatus and particularly in the assembly and alignment of gyroscopic apparatus, it is necessary to place concentrically rotating parts in a desired angular position relative to each other and then lock the parts in place with an anti-rotation device thereby preventing further relative motion between the parts.

Various techniques have been used in the prior art to lock concentrically rotating parts together in a desired position. General machining operations such as drilling and pinning are not practical in many situations due to problems of maintaining the desired position during drilling and the danger of drilling debris adversely affecting a precision apparatus with close tolerance parts. Another prior art method of locking concentrically rotating parts together uses a jam nut configuration. True jam nuts will counter rotate into one another storing strain energy in deformed threads. In pseudo-jam nut configurations, both nuts rotate in the same direction such that a second nut is run down on top of the first nut. This configuration, although simple, partially unloads the strain energy in the first nuts' threads resulting in the nuts loosening by several degrees thereby permitting undesired movement of several degrees between the two locked parts. The present invention avoids the problems presented by prior art anti-rotation devices. The harmonic locking ring of the present invention restricts relative motion between two concentric parts to a few tenths of a degree.

SUMMARY OF THE INVENTION

The apparatus of the present invention is a harmonic locking ring having a predetermined number of spaced holes with centers on a major and a minor circumference. The invention is useful in limiting the angular rotation of two concentric rotating parts to a very narrow range. Two embodiments of the present invention include a harmonic locking ring and a biased harmonic locking ring. In both embodiments, the outer hole pattern (centered on the circumference of a major diameter) and the inner hole pattern (centered on the circumference of a minor diameter) are evenly spaced around the ring with the inner pattern having one less hole than the outer pattern. In the biased harmonic locking ring embodiment, the spacing of the inner hole pattern is offset such that the outer hole pattern is advanced one half of the angular distance of the outer hole pattern in the harmonic locking ring. The alteration of the inner hole pattern doubles the effective resolution of the biased harmonic locking ring. Inverting the ring allows realization of the full compliment of holes.

DESCRIPTION OF THE PREFERRED EMBODIMENT

Figure 1:
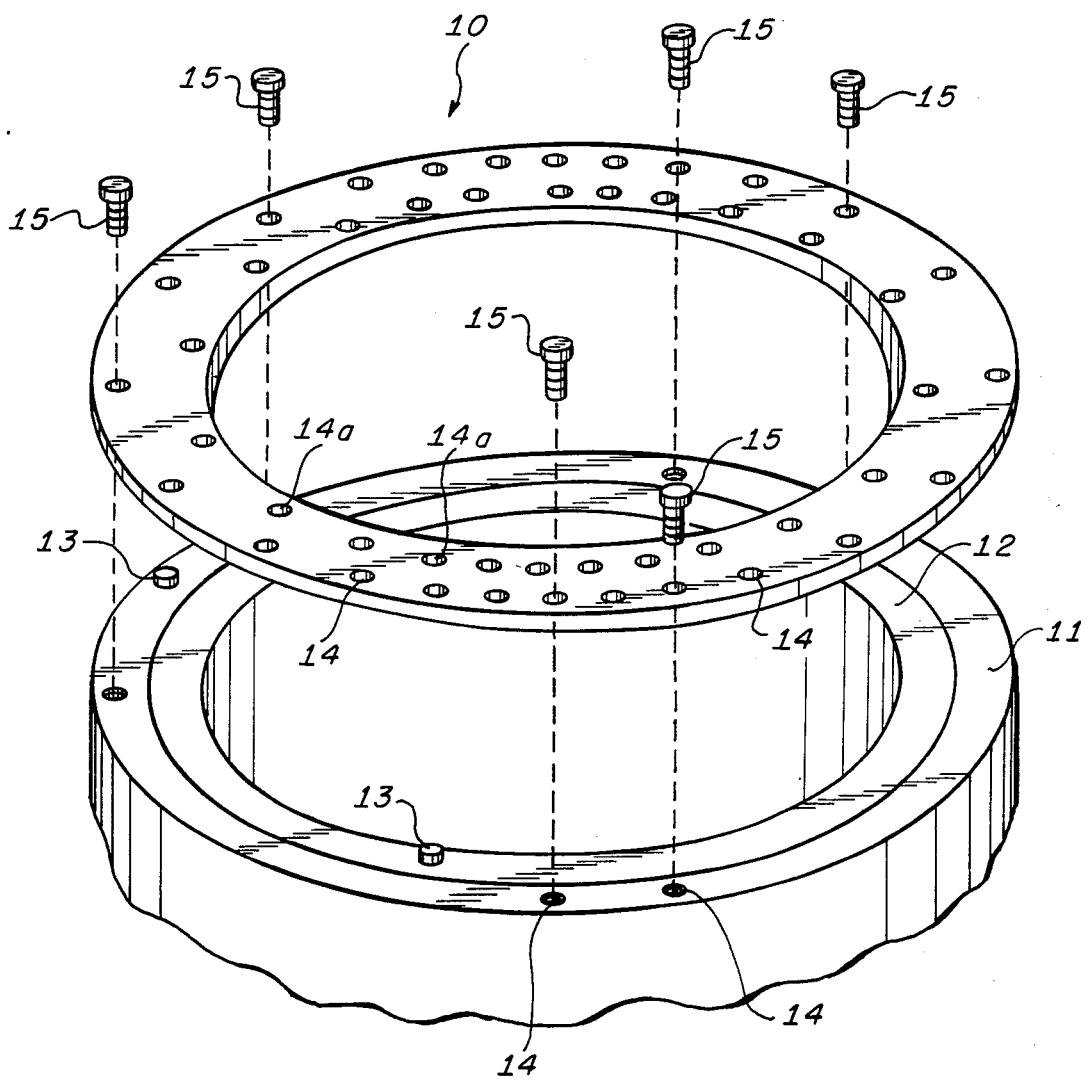
FIG. 1 illustrates a typical installation of a biased harmonic locking ring as an anti-rotation device. Hole placement is not exact.

A biased harmonic locking ring 10 is shown in FIG. 1. Two concentrically rotating parts represented by an outer cylinder 11 and inner cylindar 12 each having a pilot pin 13 are rotated to a desired position. Harmonic locking ring 10 having an outer set of holes 14 and an inner set of holes 14a is then placed over the pilot pins and rotated until both pins 13 fit into holes 14 and 14a; the positioning of which will be discussed subsequently. The ring may then be fastened to outer cylinder 11 with screws 15 fitted into threaded holes 16. The threaded holes 16 may be predrilled due to the constant angular relationship of all holes 14 on the outer ring.

The general theory of harmonic devices will now be discussed. Any harmonic device operates by having N features (gear teeth, pins, etc.) interact with N+1 features on another part. In the case of a ring 10 piloting on two fixed pins 13, a single position fit is obtained due to the principle that two consecutive integer numbers will have mutually exclusive factors. In a true harmonic device, the grouping of fewer features will incrementally gain on the greater number of features when viewed around the circumference. In this way, one revolution of the fewer featured part will cause a relative rotation with respect to the greater featured part of only one feature spacing. The final effect is to split the angular or linear distance on the greater featured part into equal increments that are additively distributed to the features of the fewer featured part. The balance of this discussion will focus on harmonic device locking principles.

Figure 2:
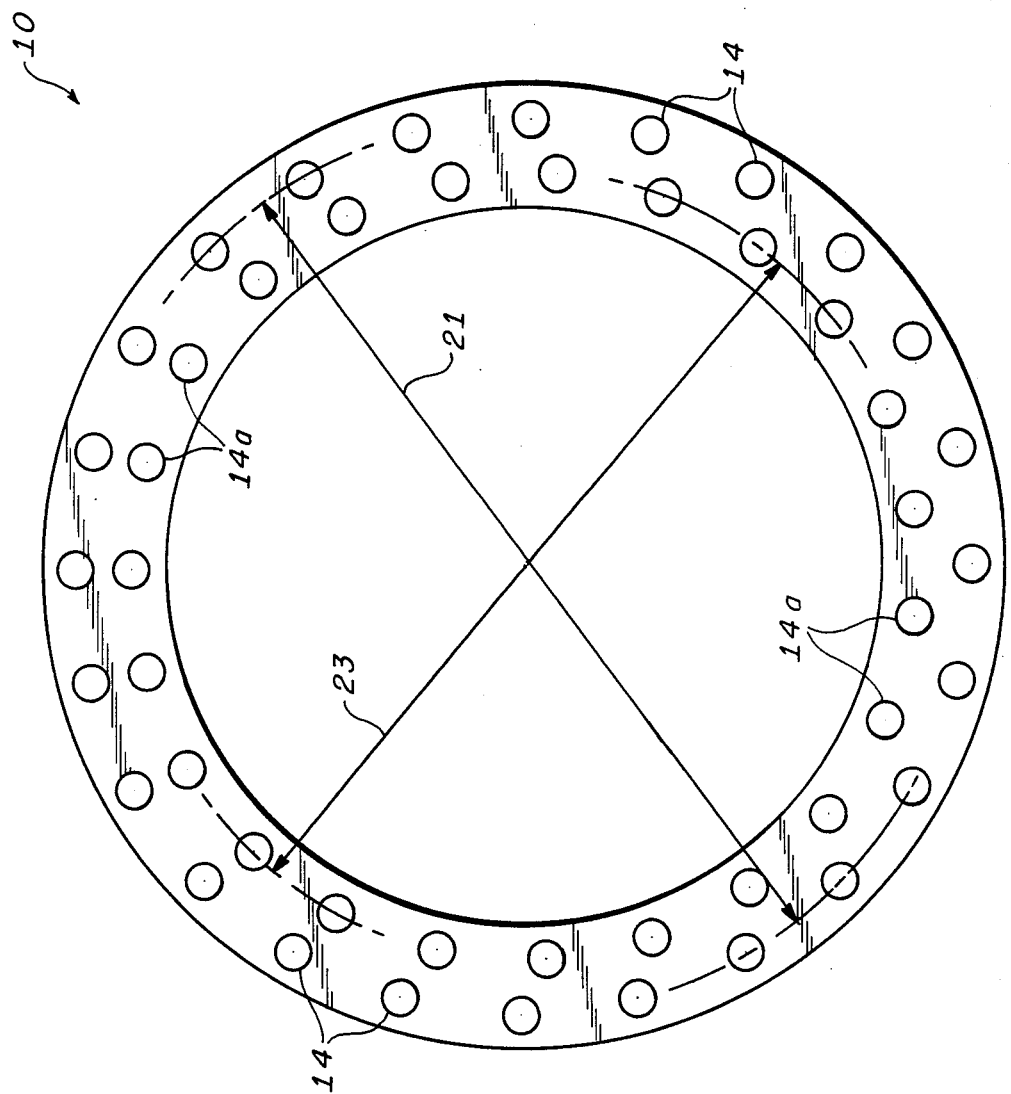
FIG. 2 is a representation of a harmonic locking ring.

Referring now to FIG. 2, the positioning of holes 14 and 14a and resolution (allowed angular rotation) of a harmonic locking ring 10 will be discussed. An outer hole pattern 14 containing $N_1$ holes is evenly spaced around harmonic locking locking ring 10 such that the angle between centers of adjacent holes is $\alpha_1$, each outer hole 14 being centered on the circumference of major diameter 21. An inner hole pattern 14a containing $N_1-1$, or $N_2$ holes is evenly spaced around harmonic locking ring 10 such that the angle between centers of adjacent holes is $\alpha_1+(\alpha_1/N_2)$ or $\alpha_2$. Thus, the incremental angle $\delta\theta=(\alpha_1/N_2)$. Each inner hole 14a is centered on the circumference of minor diameter 23.

Figure 3:
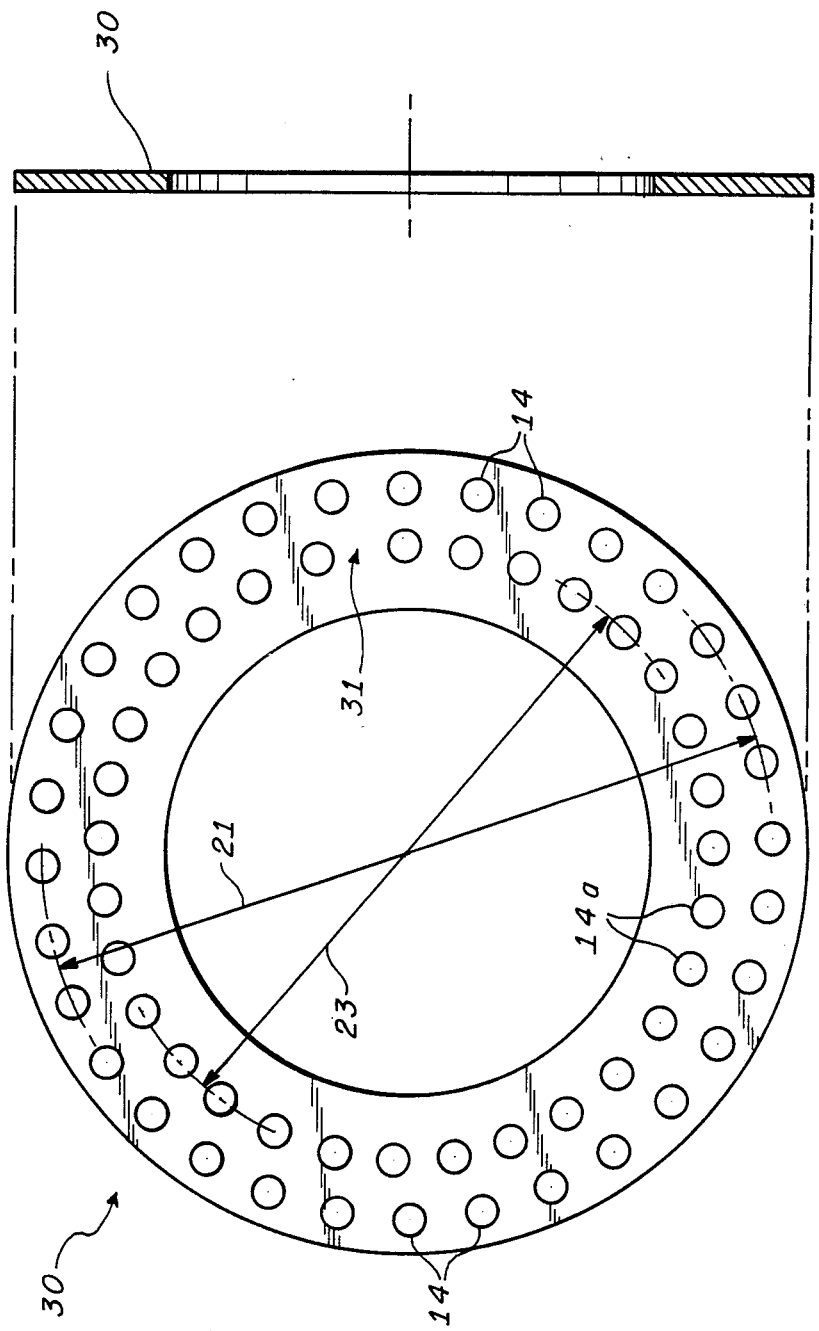
FIG. 3 is a representation of a biased harmonic locking ring.
Figure 4:
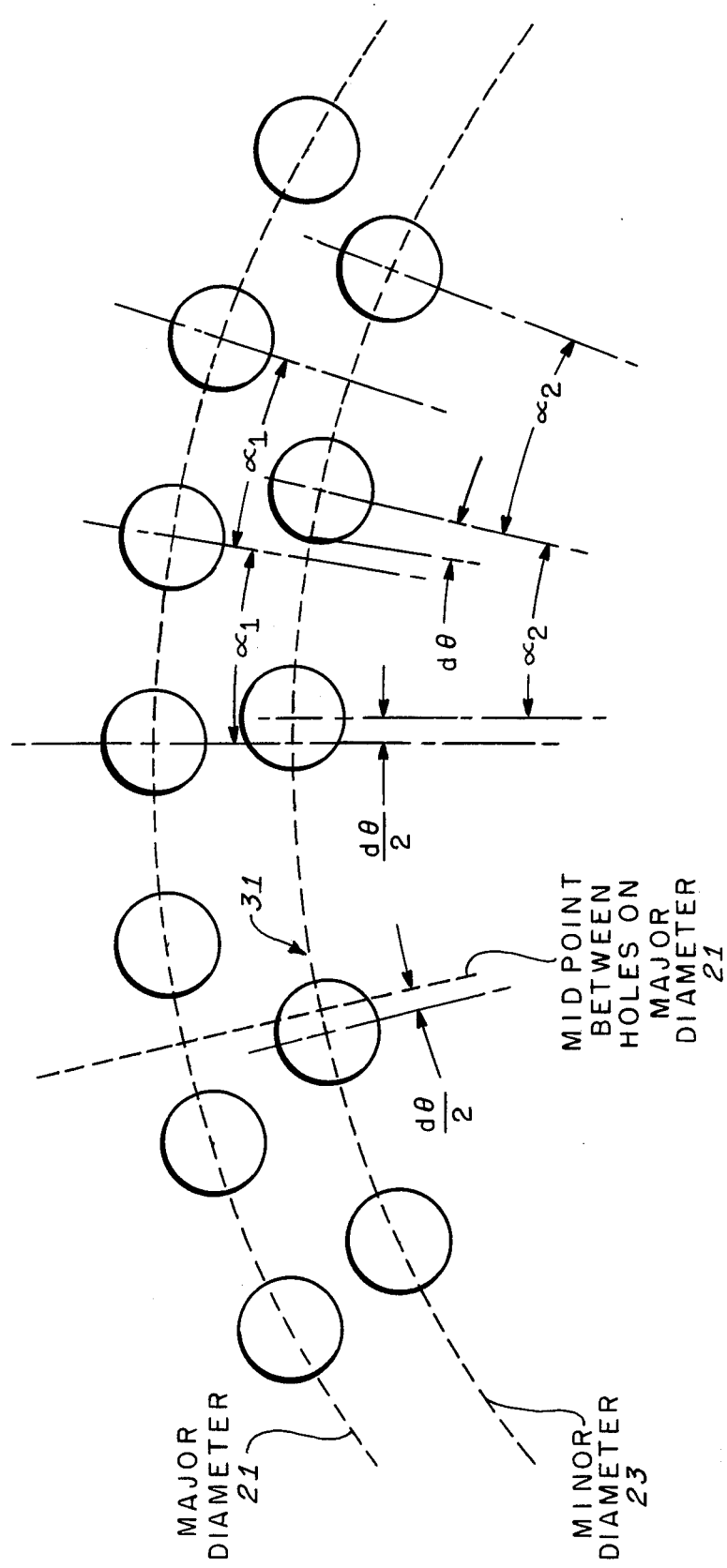
FIG. 4 illustrates the exaggerated angular relationship of the holes on a biased harmonic locking ring.

Referring now to FIG. 3 and FIG. 4, the outer hole pattern 14 of the biased harmonic locking ring 30 contains evenly spaced holes as in the harmonic locking ring 10. The inner hole portion 14c has $N_1-1$ holes. However, in the inner hole pattern 14c, the holes are not evenly spaced, rather each hole 14c is advanced only half the angle $\delta\theta$ of the inner hole pattern 14a on the harmonic locking ring. Thus there is an assymetrical space 31 in the inner hole pattern 14c as shown in FIG. 4 and inverting the ring effectively doubles the number inner holes such that $\alpha_2$ the angle between inner hole centers is now equal to $\alpha_1+(\alpha_1/N_2)$ and $\delta\theta=(\alpha_1/2N_2)$.

For any application of a harmonic locking ring, it is desireable to use as large a diameter as practical to maximize the number of holes and combinations thereof. Hole size, placement and pin size all must be traded against material properties and locking strength requirements. When the number of holes has been established, a calculation of worst case fit may be made. The following discussion assumes the greater number of holes lie on the circumference of the major diameter.

Figure 5:
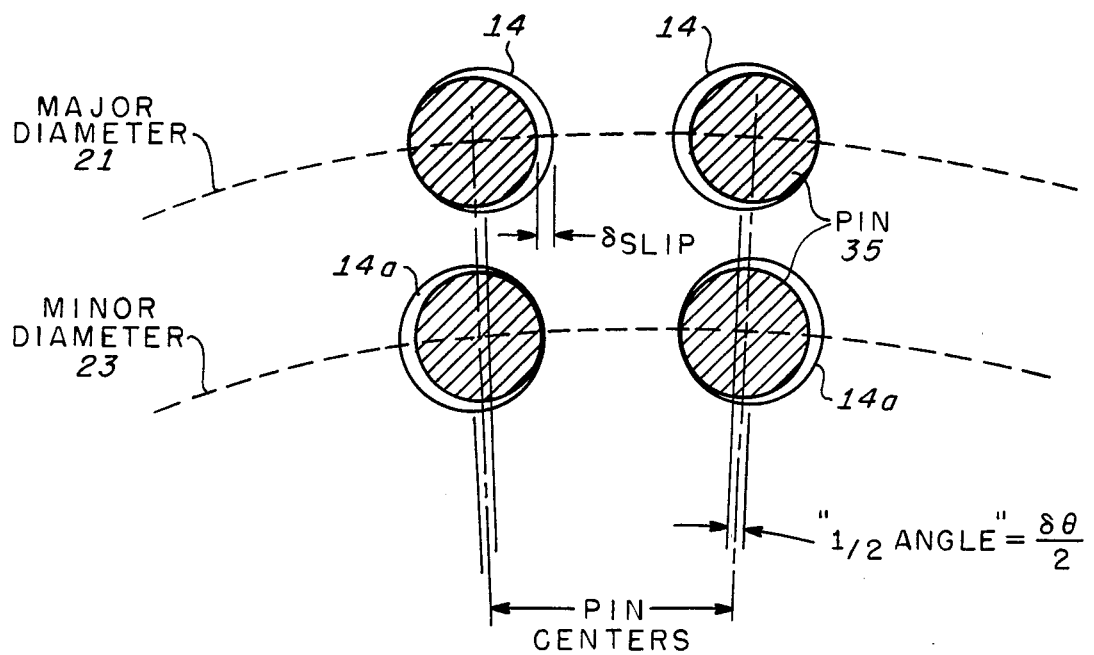
FIG. 5 illustrates the calculation of slip tolerance.

Shown in FIG. 5 are two pins positioned to represent the worst case fit. As can be seen in FIG. 5, the slip tolerance ($\delta$ slip) is very closely the same as the length of arc swept out by half of the incremental angle ($\delta\theta/2$). The equation for slip tolerance is then:

$$\delta \text{ slip} = \pi \left( \frac{D_1 + D_2}{2} \right) \frac{1}{2N_1N_2} = \pi \frac{(D_1 + D_2)}{4N_1N_2}$$

where $D_1$ and $D_2$ are the Major and Minor diameters respectively, and $N_1$ and $N_2$ are the number of holes centered on the circumference of the Major and Minor diameters respectively. It is to be noted that $\delta$ slip is a theoretical minimum to get the parts to fit. Hole and pin positioning tolerances will add to this value.

Thus, the present invention is a simple, effective and low cost apparatus for locking concentric rotating parts in a desired position and maintaining the desired position within several tenths of a degree.

While the invention has been described in its preferred embodiments, it is to be understood that the words which have been used are words of description rather than of limitation and that changes may be made within the purview of the appended claims without departing from the true scope and spirit of the invention in its broader aspects.

I claim:

1. An apparatus to prevent the rotation of two concentric parts comprising a circular ring having planar top and bottom surfaces with a plurality of holes extending through said top and bottom surfaces, centers of said holes disposed uniformly along circular paths of radius $R_1$ and $R_2$, said plurality holes disposed unformly along circular path of radius $R_1$ is one greater than said plurality of holes disposed unformly along circular path of radius $R_2$.

2. An apparatus to prevent the rotation of two concentric parts comprising a circular ring having planar top and bottom surfaces with a plurality of holes extending through said top and bottom surfaces, centers of said holes disposed along circular paths of radius $R_1$ and $R_2$, where said radius $R_1$ is greater than said radius $R_2$, said plurality of holes being uniformly disposed along said circular path of radius $R_1$ and one more in number than said plurality of holes disposed along circular path of radius $R_2$, said plurality of holes disposed along said circular path of radius $R_2$ being positioned so that an angle between successive holes is one half an incremental angle of holes positioned uniformly.

* * * * *